United States Patent
Ferro et al.

(10) Patent No.: US 11,024,151 B1
(45) Date of Patent: Jun. 1, 2021

(54) SYSTEMS AND METHODS FOR ACTIVATING MONITORING OF A SECURITY SYSTEM BY A CENTRAL MONITORING STATION

(71) Applicant: Ademco Inc., Golden Valley, MN (US)

(72) Inventors: Philip Ferro, Setauket, NY (US); Jaimohan Ramachandran, Dix Hills, NY (US); Brian Kearns, Massapequa, NY (US); Brett Vandenbussche, Minneapolis, MN (US); William R. Blum, Huntington Station, NY (US); Chandra Sekhar Ramamoorthi, Bengaluru (IN)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 16/690,880

(22) Filed: Nov. 21, 2019

(51) Int. Cl.
| | |
|---|---|
| G08B 17/00 | (2006.01) |
| G08B 25/00 | (2006.01) |
| G06F 16/23 | (2019.01) |
| G06F 9/54 | (2006.01) |
| G08B 29/06 | (2006.01) |

(52) U.S. Cl.
CPC .......... *G08B 25/004* (2013.01); *G06F 9/547* (2013.01); *G06F 16/2379* (2019.01); *G08B 29/06* (2013.01)

(58) Field of Classification Search
USPC ................................................ 340/506 TSL
See application file for complete search history.

(56) References Cited

U.S. PATENT DOCUMENTS

| | | | |
|---|---|---|---|
| 6,288,639 B1* | 9/2001 | Addy ..................... | G08B 25/10 340/3.1 |
| 2010/0315224 A1* | 12/2010 | Orsini ................. | G08B 29/126 340/516 |
| 2014/0015667 A1* | 1/2014 | Kolb ................... | G06F 11/0745 340/501 |
| 2015/0097664 A1 | 4/2015 | Breed et al. | |
| 2015/0123782 A1* | 5/2015 | Zwirn ................. | G08B 29/126 340/506 |
| 2017/0039841 A1 | 2/2017 | Wilson et al. | |
| 2017/0070361 A1 | 3/2017 | Sundermeyer et al. | |

\* cited by examiner

*Primary Examiner* — Brent Swarthout
(74) *Attorney, Agent, or Firm* — Fredrikson & Byron, P.A.

(57) ABSTRACT

Systems and methods for activating monitoring of a security system by a central monitoring station are provided. In particular, such systems and methods can include validating a first communication path between a sensor of the security system and a control panel of the security system to allow the security system to be initially set up to operate without monitoring by the central monitoring station and separately validating a second communication path between the control panel and the central monitoring station in response to the control panel or a cloud server receiving an API call from the central monitoring station to enable such monitoring at a later time.

20 Claims, 3 Drawing Sheets

SYSTEMS AND METHODS FOR ACTIVATING MONITORING OF A SECURITY SYSTEM BY A CENTRAL MONITORING STATION

FIELD

The present invention relates generally to security systems. More particularly, the present invention relates to systems and methods for activating monitoring of a security system by a central monitoring station.

BACKGROUND

Known security systems can be configured to send alarm signals to a central monitoring station with assistance from a third party dealer and installer. In particular, known security systems require the third party dealer and installer to establish a connection to the central monitoring station through a complex set up process that validates communication paths from sensors to control panels of the security systems and from the control panels to the central monitoring station. However, known security systems cannot set up the connection to the central monitoring station without the third party dealer and installer.

The drawbacks described above create problems for modern security systems in which users set up and install these security systems themselves, without employing the third party dealer and installer. In particular, the users must contact and employ the third party dealer and installer for the sole purpose of setting up the connection to the central monitoring station. Advantageously, removing this step would allow for more cost-effective security system installations, updates, and periodic system checks.

In view of the above, there is a need and an opportunity for improved systems and methods.

DETAILED DESCRIPTION

Figure 1:
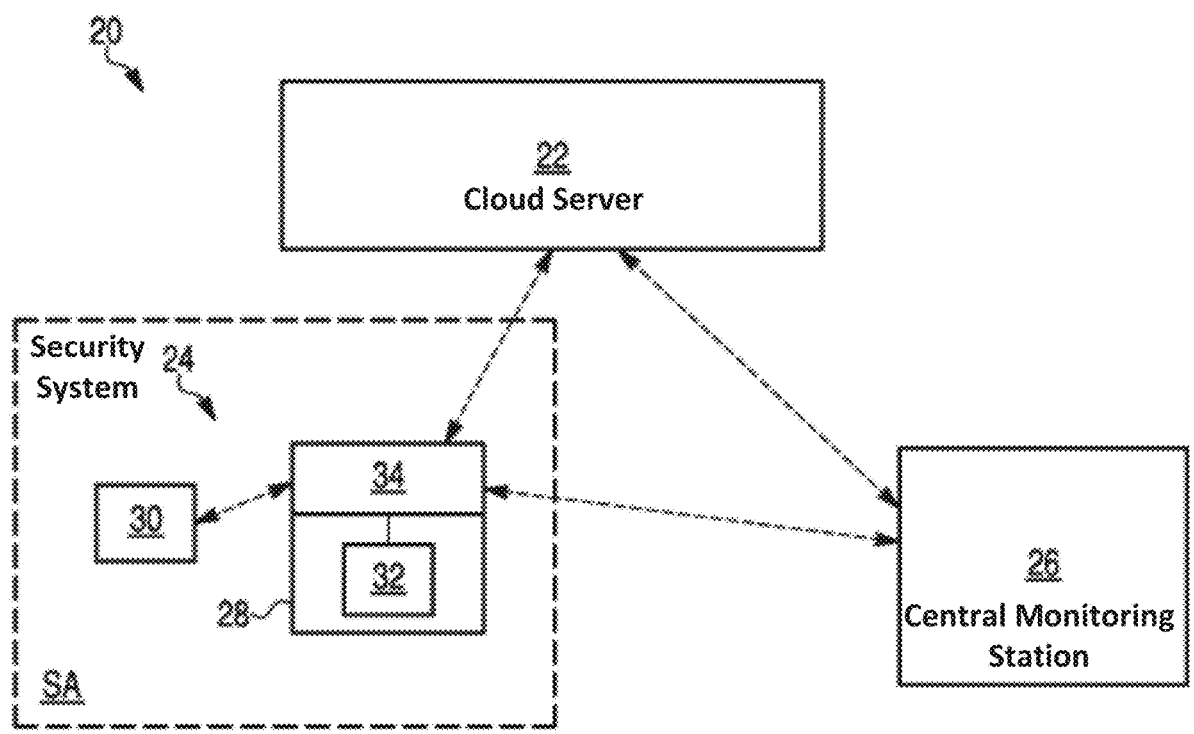
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for activating monitoring of a security system by a central monitoring station. In particular, such systems and methods can separately validate a first communication path between a sensor of the security system and a control panel of the security system and a second communication path between the control panel and the central monitoring station. Advantageously, decoupling validation of the first communication path and the second communication path in this manner can allow the security system to be initially set up to operate without monitoring by the central monitoring station and enable such monitoring at a later time.

In some embodiments, the first communication path can include a local communication path within a secured area monitored by the security system and can include any known wired or wireless communication medium, such as Ethernet, Wi-Fi, Bluetooth, copper wire, etc. Additionally or alternatively, in some embodiments, the second communication path can include a remote communication path that originates inside of the secured area and extends outside of the secured area and can include any known wired or wireless communication medium, such as the Internet, a phone network, a cellular network, an SMS network, email, etc.

In operation, the control panel can validate operation of the sensor and the first communication path and, responsive thereto, generate a database entry that documents that the first communication path is valid and that the second communication path is unverified. For example, in some embodiments, the control panel can validate the operation of the sensor and the first communication path responsive to receiving a sensor signal indicating that the sensor is tripped, for example, as part of setting up the security system. In some embodiments, the database entry can also include fields of identifying information, including, for example, an account number of the security system, a device key for the security system, an ID of the sensor, and a description of the sensor. Regardless, the control panel can save the database entry in a database synchronized with a server, which, in some embodiments, can include a remote server, such as a cloud server. Additionally or alternatively, in some embodiments, the control panel can save the database entry in a memory of the control panel.

After generating the database entry and responsive to the control panel or the cloud server receiving an API call from the central monitoring station, the control panel can simulate receipt of an alarm signal from the sensor and, responsive thereto, forward a simulated version of the alarm signal to the central monitoring station via the second communication path. In some embodiments, the control panel can simulate the receipt of the alarm signal by transmitting simulation instructions to the sensor and, responsive thereto, receiving the alarm signal from the sensor.

In some embodiments, the API call can include an input parameter identifying the security system, including, but not limited to a location of the security system, the database entry, the sensor, or the control panel. Furthermore, in some embodiments, the cloud server or the control panel can provide formatting information for the API call to the central monitoring station, and in some embodiments, the API call can enable the central monitoring station to have limited access to the cloud server and/or the control panel.

As described above, embodiments in which the control panel receives the API call directly from the central monitoring station are contemplated, and embodiments in which the cloud server receives the API call from the central monitoring station are contemplated. It is to be understood that the central monitoring station can include a permanent facility and/or a mobile facility or device.

For example, in embodiments in which the cloud server receives the API call from the central monitoring station, the cloud server can use the input parameter to identify the database entry and determine a status of the first communication path and the second communication path as identified in the database entry. Responsive to the cloud server determining that the database entry identifies the first communication path as valid and the second communication path as unverified, the cloud server can transmit an instruction signal to the control panel directing the control panel to simulate the receipt of the alarm signal from the sensor, and responsive to receiving the instruction signal, the control panel can simulate the receipt of the alarm signal. Additionally or alternatively, responsive to the cloud server determining that the database entry identifies the first communication path as valid and the second communication path as verified, the cloud server can transmit the instruction signal to the control panel to re-verify the second communication path. In some embodiments, the API call can include reverification instructions for such reverification, for example, when the second communication path has been disrupted.

In embodiments in which the control panel receives the API call directly from the central monitoring station, the control panel can use the input parameter to retrieve the database entry and determine the status of the first communication path and the second communication path as identified in the database entry. Responsive to the control panel determining that the database entry identifies the first communication path as valid and the second communication path as unverified, the control panel can simulate the receipt of the alarm signal. Additionally or alternatively, responsive to the control panel determining that the database entry identifies the first communication path as valid and the second communication path as verified, the control panel can simulate the receipt of the alarm signal to re-verify the second communication path. In some embodiments, the API call can include the reverification instructions for such reverification, for example, when the second communication path has been disrupted.

In some embodiments, after the control panel forwards the simulated version of the alarm signal to the central monitoring station, the cloud server or the control panel can receive a confirmation signal from the central monitoring station indicating that the second communication path is valid and that the central monitoring station is ready to receive the alarm signal at future times to notify the control panel of the same. When the cloud server receives the confirmation signal from the central monitoring station, the cloud server can forward the confirmation signal to the control panel.

For example, in some embodiments, responsive to the control panel forwarding the simulated version of the alarm signal to the central monitoring station, the central monitoring station can confirm that the second communication path is valid and transmit the confirmation signal to the control panel, which, responsive thereto, can update the database entry to document that the second communication path is valid. In embodiments in which the database entry is stored on the database synced with the cloud server, the control panel can forward the confirmation signal to the cloud server for updating the database entry. However, in embodiments in which the database entry is saved in the memory of the control panel, the control panel can update the database entry in the memory to document that the second communication path is valid.

Additionally or alternatively, responsive to the control panel forwarding the simulated version of the alarm signal to the central monitoring station, the central monitoring station can confirm that the second communication path is valid and transmit the confirmation signal to the cloud server, which, responsive thereto, can update the database entry to document that the second communication path is valid. In embodiments in which the database entry is saved in the memory of the control panel, the cloud server can forward the confirmation signal to the control panel for updating the database entry.

In some embodiments, when the control panel or the cloud server fails to receive the confirmation signal from the cloud server or the central monitoring station within a predetermined period of time, the control panel or the cloud server can resend the simulated version of the alarm signal to the central monitoring station. However, if such a failure continues after a predetermined number of attempts to verify the second communication path, then the control panel and/or the cloud server can transmit a failure signal to a user device associated with the security system and/or to the control panel.

Notifying the control panel that the central monitoring station is ready to receive the alarm signal at future times can enable the control panel to report the receipt of the alarm signal to the central monitoring station when the alarm signal is not simulated. For example, when the alarm signal is real and not simulated and the control panel receives the real, non-simulated version of the alarm signal from the sensor after receiving the confirmation signal, the control panel can forward the real, non-simulated version the alarm signal to the central monitoring station via the second communication path. However, when the control panel receives the real, non-simulated version of the alarm signal from the sensor before receiving the confirmation signal, the control panel can refrain from forwarding the real, non-simulated version of the alarm signal to the central monitoring station. In some embodiments, the control panel can determine that the alarm signal is the real, non-simulated version of the alarm signal when the control panel receives the alarm signal from the sensor without receiving the instruction signal from the cloud server or the API call from the central monitoring station within a predetermined period of time prior thereto.

In some embodiments, when the control panel receives the real, non-simulated version of the alarm signal, the control panel can retrieve and consult the database entry to determine whether to forward the real, non-simulated version of the alarm signal to the central monitoring station. For example, when the database entry indicates that the second communication path is valid, the control panel can forward the real, non-simulated version of the alarm signal to the central monitoring station via the second communication path. However, when the database entry indicates that the second communication path is unverified, the control panel can refrain from forwarding the real, non-simulated version of the alarm signal to the central monitoring station.

In any embodiment, when the control panel refrains from forwarding the real, non-simulated version of the alarm signal to the central monitoring station, the control panel can initiate other security actions to protect a premises in which the security system is installed. For example, in some embodiments, the control panel can trigger local alert indicators, such as sirens or flashing lights, to deter a potential intruder and/or to alert neighbors about the potential intruder or other security breach that triggered the real, non-simulated version of the alarm signal. Additionally or alternatively, in some embodiments, the control panel can transmit an alert signal to the user device to notify a user about the potential intruder or other security breach that triggered the real, non-simulated version of the alarm signal. Upon receipt of the alert signal, the user device can monitor the premises and be used to determine whether the real, non-simulated alarm signal is valid and whether to alert local authorities without use of the central monitoring station. That is, when the control panel refrains from forwarding the real, non-simulated version of the alarm signal to the central monitoring station because the second communication path is unverified, the real, non-simulated version of the alarm signal can be processed locally without monitoring by the central station.

It is to be understood that each of the sensor, the control panel, and the cloud server as disclosed herein can include a respective transceiver and a respective memory, each of which can be in communication with respective control circuitry, one or more respective programmable processors, and respective executable control software as would be understood by one of ordinary skill in the art. In some embodiments, the respective control software of each of the sensor, the control panel, and the cloud server can be stored on a respective transitory or non-transitory computer readable medium, including, but not limited to local computer memory, RAM, optical storage media, magnetic storage media, flash memory, and the like, and some or all of the respective control circuitry, the one or more respective programmable processors, and the respective control software of each of the sensor, the control panel, and the cloud server can execute and control at least some of the methods described herein.

FIG. 1 is a block diagram of a system 20 according to disclosed embodiments. As seen in FIG. 1, in some embodiments, the system 20 can include a cloud server 22, a security system 24 that monitors a secured area SA, and a central monitoring station 26. As also seen in FIG. 1, in some embodiments, the security system 24 can include a control panel 28 and a sensor 30, and in some embodiments, the control panel 28 can include a programmable processor 32 and a transceiver 34 for communicating with the sensor 30, the cloud server 22, and the central monitoring station 26.

Figure 2:
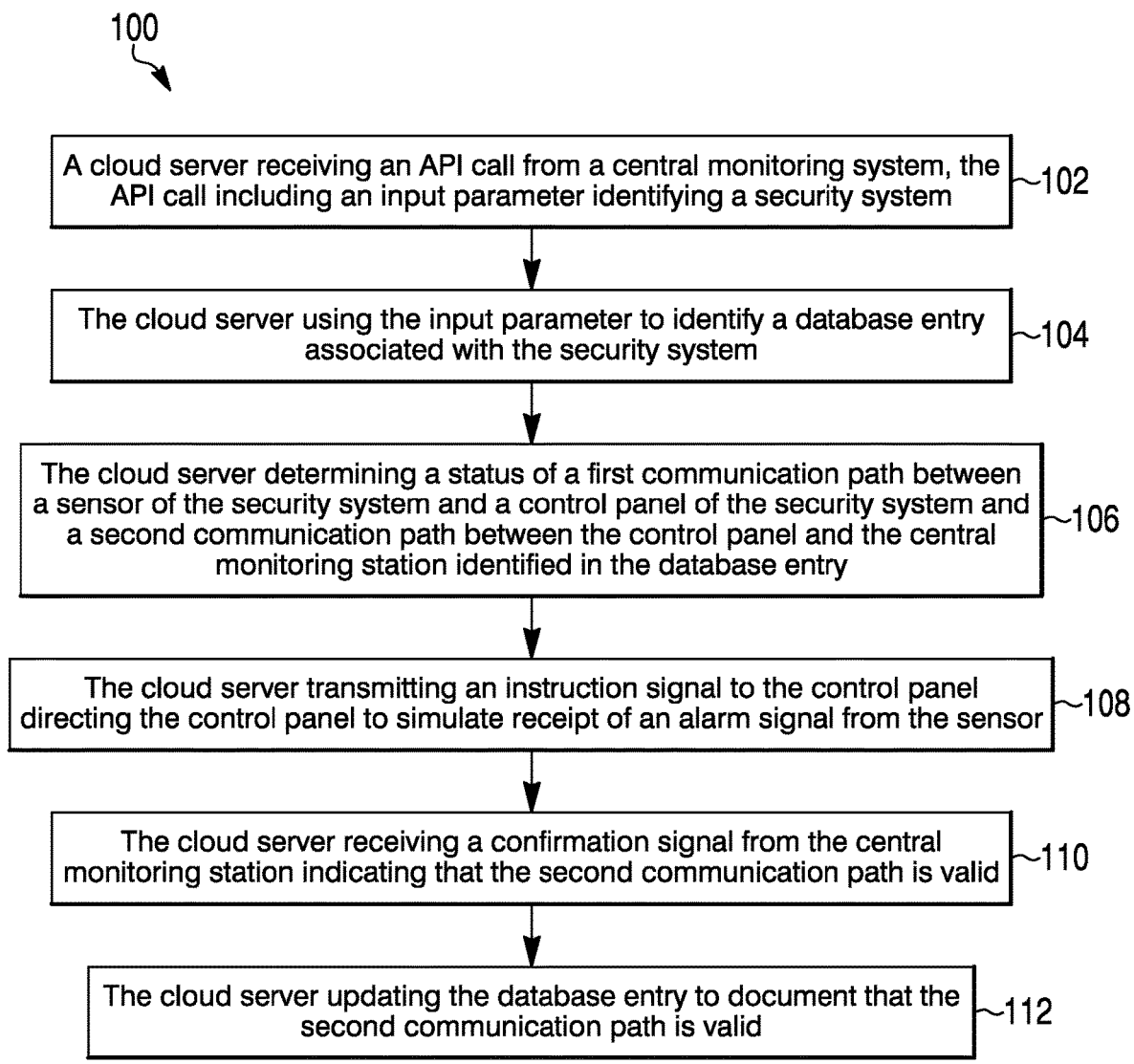
FIG. 2 is a flow diagram of a method in accordance with disclosed embodiments.

FIG. 2 is a flow diagram of a method 100 according to disclosed embodiments. As seen in FIG. 2, in some embodiments, the method 100 can include the cloud server 22 receiving an API call from the central monitoring station 26, as in 102, wherein the API call can include an input parameter identifying the security system 24. Responsive to receiving the API call, the method 100 can include the cloud server 22 using the input parameter to identify a database entry associated with the security system 24, as in 104, and responsive to identifying the database entry, determining a status of a first communication path between the sensor 30 and the control panel 28 and a second communication path between the control panel 28 and the central monitoring station 26 as identified in the database entry, as in 106. When the cloud server 22 determines that the database entry identifies the first communication path as valid and the second communication path as unverified, the method 100 can include the cloud server 22 transmitting an instruction signal to the control panel 28 directing the control panel 28 to simulate receipt of an alarm signal from the sensor 30, as in 108. Responsive thereto, the control panel 28 can simulate the receipt of the alarm signal from the sensor 30 and forward a simulated version of the alarm signal to the central monitoring station 26 via the second communication path. Then, the method 100 can include the cloud server 22 receiving a confirmation signal from the central monitoring station 26 indicating that the second communication path is valid, as in 110, and responsive thereto, updating the database entry to document that the second communication path is valid, as in 112.

Figure 3:
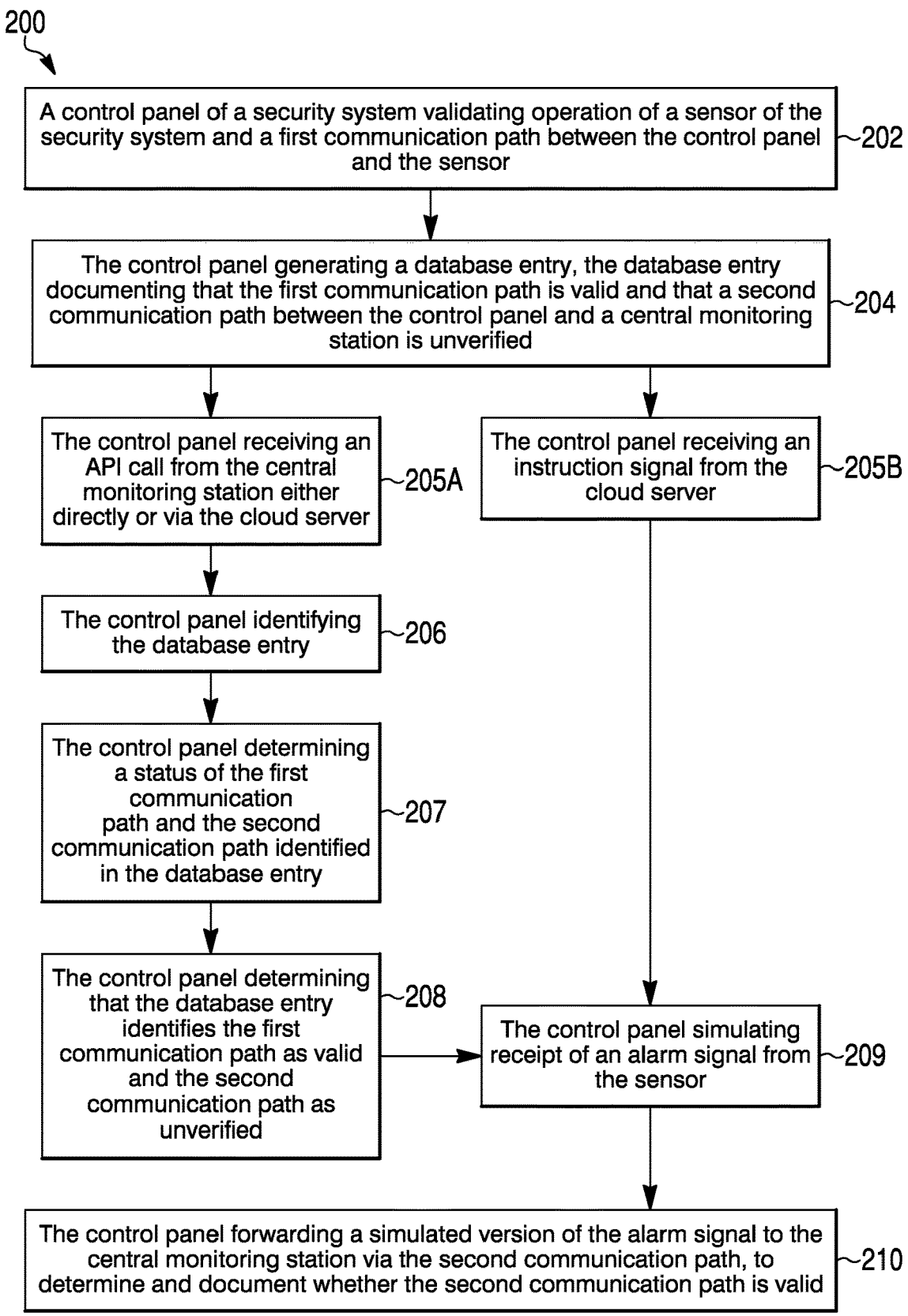
FIG. 3 is a flow diagram of a method in accordance with disclosed embodiments.

FIG. 3 is a flow diagram of a method 200 according to disclosed embodiments. As seen in FIG. 3, in some embodiments, the method 200 can include the control panel 28 validating operation of the sensor 30 and the first communication path, as in 202, and responsive thereto, generating the database entry, as in 204. Then, the method 200 can include the control panel 28 receiving the API call from the central monitoring station 26 either directly or via the cloud server 22, as in 205A, or receiving the instruction signal from the cloud server 22, as in 205B. Responsive to receiving the API call, the method 200 can include the control panel 28 identifying the database entry, as in 206, and responsive thereto, determining the status of the first communication path and the second communication path as identified in the database entry, as in 207. When the control panel 28 determines that the database entry identifies the first communication path as valid and the second communication path as unverified, as in 208, or responsive to receiving the instruction signal, as in 205B, the method 200 can include the control panel 28 simulating the receipt of the alarm signal from the sensor 30, as in 209, and responsive thereto, forwarding the simulated version of the alarm signal to the central monitoring station 26 via the second communication path, as in 210, to determine and document whether the second communication path is valid.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method of activating monitoring of a security system by a central monitoring station using a cloud server, the method comprising:
   receiving at the cloud server a call from the central monitoring station, the call including an input parameter identifying the security system;
   using the input parameter to identify a database entry associated with the security system;
   determining a status of a first communication path between a sensor of the security system and a control panel of the security system and a second communication path between the control panel and the central monitoring station as identified in the database entry;
   responsive to determining that the database entry identifies the first communication path as valid and the second communication path as unverified, transmitting an instruction signal from the cloud server to the control panel directing the control panel to simulate receipt of an alarm signal from the sensor;
   receiving at the cloud server a confirmation signal from the central monitoring station, the confirmation signal indicating that the second communication path is valid; and
   updating the database entry to document that the second communication path is valid.

2. The method of claim 1 further comprising:
   receiving at the cloud server a request for the database entry from the control panel; and
   forwarding the database entry from the cloud server to the control panel.

3. The method of claim 1 further comprising:
responsive to receiving the confirmation signal, transmitting a notification signal from the cloud server to the control panel indicating that the second communication path is valid and that the central monitoring station is ready to receive the alarm signal at future times.

4. The method of claim 1 wherein the input parameter includes information identifying the database entry, the sensor, or the control panel.

5. A method of activating monitoring of a security system by a central monitoring station using a control panel, the method comprising:
validating operation of a sensor of the security system and a first communication path between the control panel and the sensor;
generating a database entry documenting that the first communication path is valid and that a second communication path between the control panel and the central monitoring station is unverified;
responsive to the control panel receiving an instruction signal from the central monitoring station directly or via a cloud server, simulating at the control panel receipt of an alarm signal from the sensor; and
forwarding a simulated version of the alarm signal from the control panel to the central monitoring station via the second communication path to determine and document whether the second communication path is valid.

6. The method of claim 5 further comprising:
receiving at the control panel the alarm signal from the sensor;
responsive to receiving the alarm signal, retrieving the database entry;
when the database entry indicates that the second communication path is valid, forwarding a non-simulated version of the alarm signal from the control panel to the central monitoring station via the second communication path; and
when the database entry indicates that the second communication path is unverified, refraining from forwarding the non-simulated version of the alarm signal to the central monitoring station.

7. The method of claim 5 further comprising:
responsive to forwarding the simulated version of the alarm signal to the central monitoring station, receiving at the control panel a notification signal indicating that the second communication path is valid and that the central monitoring station is ready to receive the alarm signal at future times;
when the control panel receives the alarm signal from the sensor after receiving the notification signal, forwarding a non-simulated version of the alarm signal from the control panel to the central monitoring station via the second communication path; and
when the control panel receives the alarm signal from the sensor before receiving the notification signal, refraining from forwarding the non-simulated version of the alarm signal to the central monitoring station.

8. The method of claim 5 further comprising:
receiving at the control panel a sensor signal indicating that the sensor is tripped; and
responsive to the control panel receiving the sensor signal, validating the operation of the sensor and the first communication path.

9. The method of claim 5 further comprising:
saving the database entry in a database synchronized with the cloud server.

10. The method of claim 9 further comprising:
responsive to forwarding the simulated version of the alarm signal to the central monitoring station, receiving at the control panel a confirmation signal from the central monitoring station indicating that the second communication path is valid; and
forwarding the confirmation signal from the control panel to the cloud server for updating the database entry to document that the second communication path is valid.

11. The method of claim 5 further comprising:
saving the database entry in a memory of the control panel.

12. The method of claim 11 further comprising:
receiving a call in the instruction signal, the call including an input parameter identifying the database entry, the sensor, or the control panel;
using the input parameter to retrieve the database entry and determine a status of the first communication path and the second communication path as identified in the database entry;
responsive to determining that the database entry identifies the first communication path as valid and the second communication path as unverified, simulating the receipt of the alarm signal from the sensor;
receiving at the control panel a confirmation signal from the central monitoring station indicating that the second communication path is valid; and
updating the database entry to document that the second communication path is valid.

13. The method of claim 5 further comprising:
simulating the receipt of the alarm signal by transmitting simulation instructions from the control panel to the sensor and, responsive thereto, receiving the alarm signal at the control panel from the sensor.

14. A control panel of a security system comprising:
a transceiver; and
a programmable processor coupled to the transceiver,
wherein the programmable processor validates operation of a sensor of the security system and a first communication path between the transceiver and the sensor,
wherein, responsive to the programmable processor validating the operation of the sensor and the first communication path, the programmable processor generates a database entry that documents that the first communication path is valid and that a second communication path between the transceiver and a central monitoring station is unverified,
wherein, responsive to the transceiver receiving an instruction signal from the central monitoring station directly or via a cloud server, the programmable processor simulates receipt of an alarm signal from the sensor, and
wherein, responsive to simulating the receipt of the alarm signal, the programmable processor forwards a simulated version of the alarm signal to the central monitoring station via the second communication path to determine and document whether the second communication path is valid.

15. The control panel of claim 14 wherein, responsive to the transceiver receiving the alarm signal from the sensor, the programmable processor retrieves the database entry, wherein, when the database entry indicates that the second communication path is valid, the programmable processor forwards a non-simulated version of the alarm signal to the central monitoring station via the second communication path, and wherein, when the database entry indicates that the second communication path is unverified, the programmable processor refrains from forwarding the non-simulated version of the alarm signal to the central monitoring station.

16. The control panel of claim 14 wherein, responsive to the programmable processor forwarding the non-simulated version of the alarm signal to the central monitoring station, the transceiver receives a notification signal indicating that the second communication path is valid and that the central monitoring station is ready to receive the alarm signal at future times, wherein, when the transceiver receives the alarm signal from the sensor after receiving the notification signal, the programmable processor forwards a non-simulated version of the alarm signal to the central monitoring station via the second communication path, and wherein, when the transceiver receives the alarm signal from the sensor before receiving the notification signal, the programmable processor refrains from forwarding the non-simulated version of the alarm signal to the central monitoring station.

17. The control panel of claim 14 wherein, responsive to generating the database entry, the programmable processor saves the database entry in a database synchronized with the cloud server, wherein, responsive to the programmable processor forwarding the simulated version of the alarm signal to the central monitoring station, the transceiver receives a confirmation signal from the central monitoring station indicating that the second communication path is valid, and wherein, responsive to the transceiver receiving the confirmation signal, the programmable processor forwards the confirmation signal to the cloud server for updating the database entry to document that the second communication path is valid.

18. The control panel of claim 14 further comprising:
a memory,
wherein, responsive to generating the database entry, the programmable processor saves the database entry in the memory.

19. The control panel of claim 18 wherein the instruction signal includes a call and an input parameter identifying the database entry, the sensor, or the control panel, wherein, the programmable processor uses the input parameter to retrieve the database entry and determine a status of the first communication path and the second communication path as identified in the database entry, wherein, responsive to determining that the database entry identifies the first communication path as valid and the second communication path as unverified, the programmable processor simulates the receipt of the alarm signal from the sensor, wherein, responsive to the programmable processor forwarding the simulated version of the alarm signal to the central monitoring station, the transceiver receives a confirmation signal from the central monitoring station indicating that the second communication path is valid, and wherein, responsive to receiving the confirmation signal, the programmable processor updates the database entry to document that the second communication path is valid.

20. The control panel of claim 14 wherein the programmable processor simulates the receipt of the alarm signal from the sensor by transmitting simulation instructions to the sensor and, responsive thereto, receiving the alarm signal from the sensor.

* * * * *